(12) United States Patent
Hara

(10) Patent No.: US 6,351,957 B2
(45) Date of Patent: Mar. 5, 2002

(54) AUTOMOTIVE AIR CONDITIONING SYSTEM

(75) Inventor: Junichiro Hara, Tochigi (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/731,038

(22) Filed: Dec. 7, 2000

(51) Int. Cl.$^7$ .............................. B60H 1/32; F25B 27/00
(52) U.S. Cl. .............................. 62/133; 62/158; 62/230; 62/236; 62/323.3; 62/243; 123/339.17
(58) Field of Search .......................... 62/133, 236, 230, 62/157, 158, 231, 180, 186, 323.1, 323.3, 323.4, 228.1, 228.5, 243; 123/339.17, 339.18

(56) References Cited

U.S. PATENT DOCUMENTS

| | | | |
|---|---|---|---|
| 5,867,996 A | 2/1999 | Takano et al. | 62/175 |
| 5,896,750 A | * 4/1999 | Karl | 62/236 |
| 6,109,237 A | 8/2000 | Pels et al. | 123/339.19 |

FOREIGN PATENT DOCUMENTS

| | | |
|---|---|---|
| DE | 195 13 710 | 10/1995 |
| EP | 0 978 653 | 2/2000 |
| EP | 1 018 446 | 7/2000 |
| JP | 9-324668 | 12/1997 |
| JP | 10-236151 | 9/1998 |
| JP | 10-258629 | 9/1998 |
| JP | 11-99824 | 4/1999 |
| JP | 2000-110734 | 4/2000 |
| JP | 2000-205122 | 7/2000 |
| JP | 2000-229515 | 8/2000 |
| JP | 2000-229516 | 8/2000 |
| JP | 2000-230482 | 8/2000 |

* cited by examiner

*Primary Examiner*—Harry B. Tanner
(74) *Attorney, Agent, or Firm*—Foley & Lardner

(57) ABSTRACT

An air conditioning system for use in a motor vehicle powered by an internal combustion engine is described. The system comprises an electric motor powered by a battery; a compressor arranged to be powered by at least one of the internal combustion engine and the electric motor; and a control unit that controls the driving of the compressor. The control unit is configured to execute driving the compressor by only the electric motor when the combustion engine is under an idling stop; restarting the combustion engine upon expiration of a first given time from the time when the idling stop has occurred, so that thereafter the compressor is driven by both the combustion engine and the electric motor; and stopping the driving of the compressor by the electric motor upon expiration of a second given time from the restarting of the combustion engine, so that thereafter the compressor is driven by only the combustion engine.

13 Claims, 12 Drawing Sheets

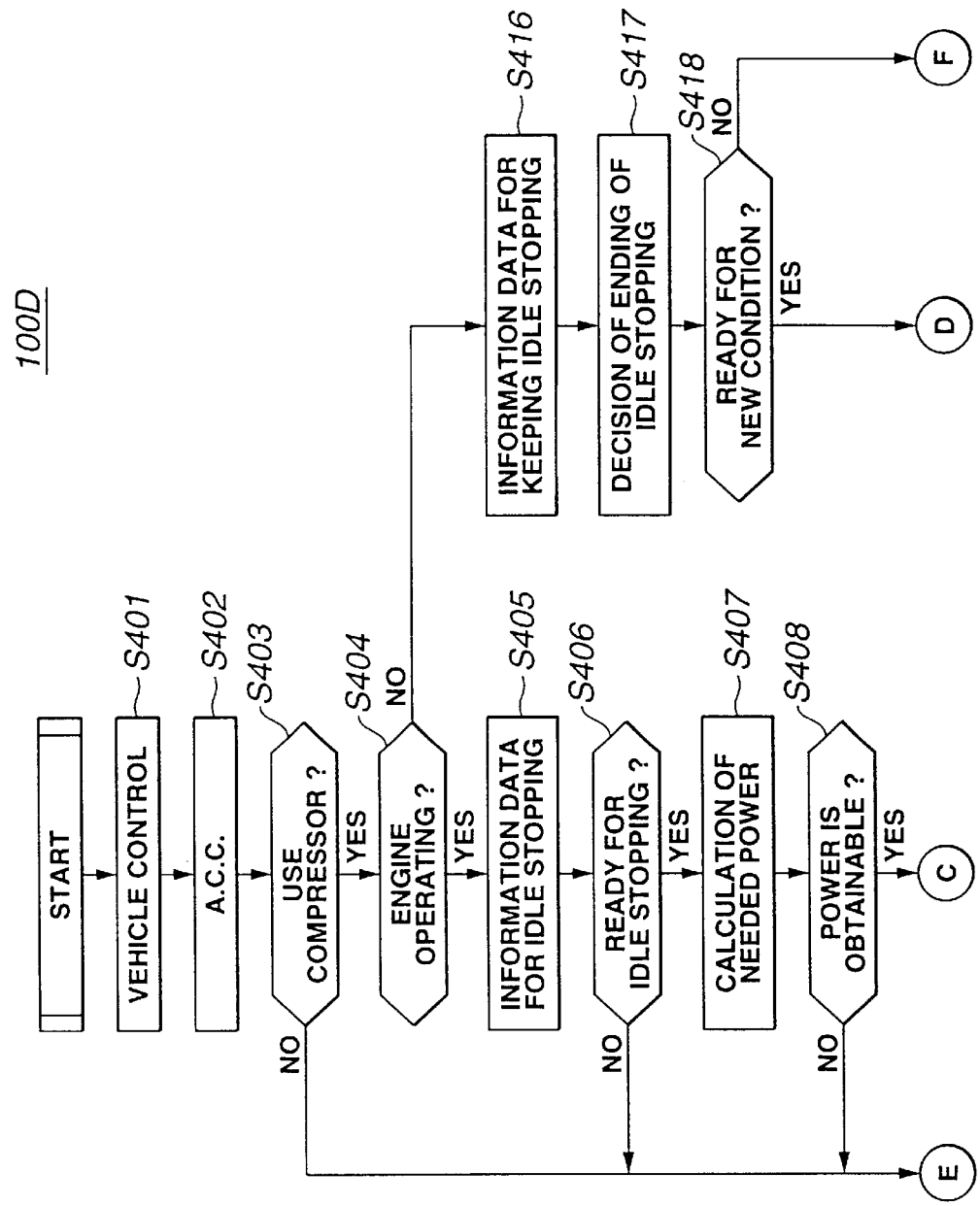

AUTOMOTIVE AIR CONDITIONING SYSTEM

BACKGROUND OF THE INVENTION

1. Field of the Invention

The present invention relates in general to automotive air conditioning systems and more particularly to automotive air conditioning systems of a type suitable for motor vehicles which exhibit an excellent fuel consumption, such as a motor vehicle which is constructed to stop its engine when stops due to a red light at a crossing or the like or a hybrid motor vehicle which is equipped with both an internal combustion engine and an electric motor and effectively powered by at least one of them. More specifically, the present invention relates to an air conditioning systems for such low fuel consumption motor vehicles, which is kept operative even when the motor vehicle is under an idling step stopping the engine.

2. Description of the Prior Art

In order to clarify the task of the present invention, a known automotive air conditioning system of the above-mentioned type will be described, which is disclosed in Japanese Laid-open Patent Application 10-236151.

The known automotive air conditioning system is constructed to keep operation of the compressor with an electric power even when the engine of an associated motor vehicle is stopped. For operation of the compressor, an electric motor powered by a battery mounted on the vehicle is practically used. The compressor is of a capacity variable type, and upon operation of the compressor by the electric motor, the capacity of the compressor is automatically lowered to lessen the load of the battery. With this, the capacity of not only the battery but also the electric motor can be reduced and the electric power supplied by the battery can be saved.

In the Laid-open Application, a measure is further disclosed wherein selection of one of the power sources (viz., the engine and the battery) is effected in accordance with the power actually needed by the cooling section of the air conditioning system. That is, when the needed power is higher than a predetermined level, the compressor is driven by the engine, while when the needed power is lower than the predetermined level, the compressor is driven by the electric motor. Particularly, the compressor has two operation modes, which are a high-power mode wherein the compressor is driven by the engine while keeping its normal higher capacity, and a low-power mode wherein the compressor is driven by the electric power while keeping its lower capacity.

In operation, upon stopping of the engine by a standstill of the vehicle due to, for example, a red light at a crossing, the compressor is shifted to the low-power mode and thus driven by the electric motor. When, thereafter, due to change of the light from red to blue, the engine of the vehicle is restarted, the compressor is shifted from the low-power mode to the high-power mode.

However, due to its inherent construction, the above-mentioned known automotive air conditioning system has failed to quickly carry out the shifting from the low-power mode to the high-power mode. In fact, several seconds are needed for carrying out the shifting, which include a time for stopping the electric motor, a time for returning the capacity of the compressor to the normal higher one and a time for restarting the engine. During this period, the compressor is kept inoperative and thus the cooling section of the air conditioning system can not exhibit its cooling performance effectively.

SUMMARY OF THE INVENTION

It is therefore an object of the present invention to provide an automotive air conditioning system which is free of the above-mentioned drawbacks.

According to a first aspect of the present invention, there is provided an air conditioning system for use in a motor vehicle powered by an internal combustion engine. The system comprises an electric motor powered by a battery; a compressor arranged to be powered by at least one of the internal combustion engine and the electric motor; and a control unit that controls the driving of the compressor, the control unit being configured to execute driving the compressor by only the electric motor when the combustion engine is under an idling stop; restarting the combustion engine upon expiration of a first given time from the time when the idling stop has occurred, so that thereafter the compressor is driven by both the combustion engine and the electric motor; and stopping the driving of the compressor by the electric motor upon expiration of a second given time from the restarting of the combustion engine, so that thereafter the compressor is driven by only the combustion engine.

According to a second aspect of the present invention, there is provided an air conditioning system for use in a motor vehicle powered by an internal combustion engine. The system comprises an electric motor powered by a battery; a capacity variable compressor arranged to be powered by at least one of the internal combustion engine and the electric motor; and a control unit that controls the driving of the compressor, the control unit being configured to execute (a) calculating a power needed for driving the compressor when the vehicle is ready for an idling stop of the engine; (b) starting the electric motor when it is decided that the calculated power is obtainable by only the electric motor, so that thereafter the compressor is driven by both the internal combustion engine and the electric motor; and (c) executing the idling stop upon expiration of a first predetermined time from the time when the electric motor has started.

According to a third aspect of the present invention, there is provided an air conditioning system for use in a motor vehicle powered by an internal combustion engine. The system comprises an electric motor powered by a battery; a capacity variable compressor arranged to be powered by at least one of the internal combustion engine and the electric motor, the compressor being controllable to have a high predetermined capacity, a lower level of a low predetermined capacity or a higher level of the low predetermined capacity; an air inlet opening controller arranged to inlet at least one of outside air and inside air into an air inlet opening of the air conditioning system, the air inlet opening controller having a first mode in which a normally conditioned air is led into a passenger room and a second mode in which the air inlet opening inlets either one of the outside air and inside air, that shows a temperature close to a target temperature of air blown into the passenger room; and a control unit that controls the driving of the compressor and the air inlet opening controller, the control unit being configured to execute (a) keeping the compressor to operate in the high predetermined capacity and keeping the air inlet opening controller to operate in the first mode when the compressor is driven by only the engine; (b) controlling the compressor to have the lower level of the low predetermined capacity and controlling the air inlet opening controller to assume the second mode upon receiving a signal representative of a previous notice of a temporary engine stop; (c) turning the electric motor ON; (d) stopping the engine upon passage of a given time from the turning ON of the electric motor; and (e) controlling the compressor to operate in the higher level of the low predetermined capacity upon passage of a given time from the engine stopping.

BRIEF DESCRIPTION OF THE DRAWINGS

Other objects and advantages of the present invention will become apparent from the following description when taken in conjunction with the accompanying drawings, in which:

FIGS. 9A and 9B are upstream and downstream parts of a flowchart of operation steps executed in a fourth embodiment of the present invention.

DETAILED DESCRIPTION OF THE EMBODIMENTS

Figure 1:
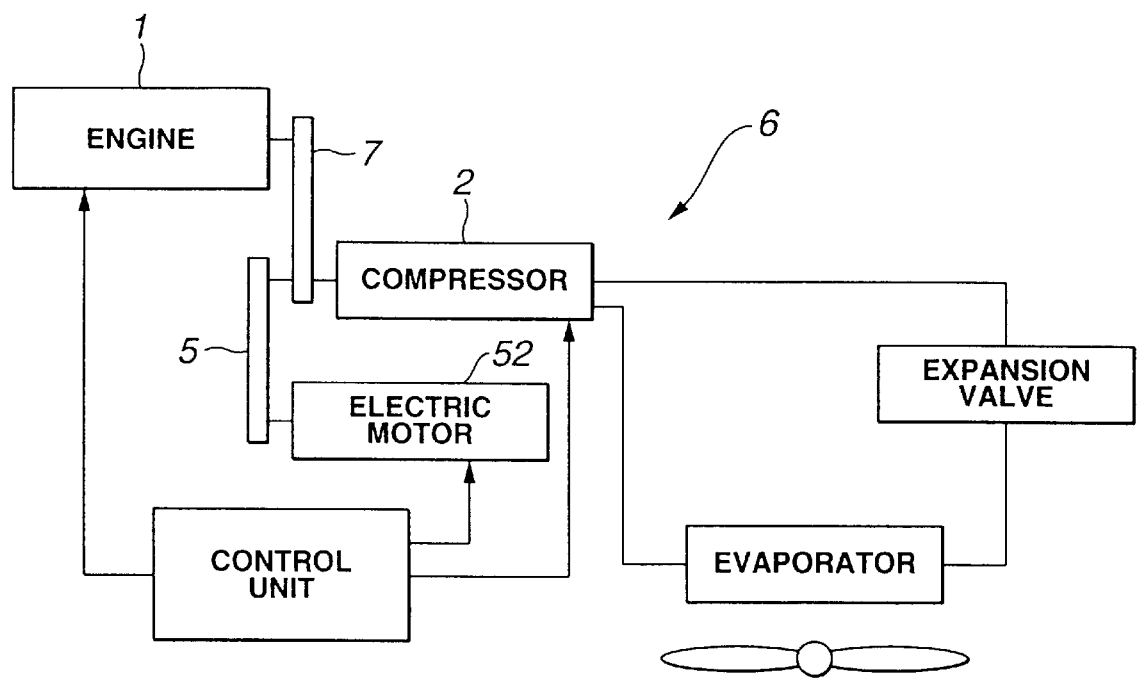
FIG. 1 is a block diagram showing an outline of an automotive air conditioning system of the present invention.

Referring to FIG. 1 of the drawings, there is shown the outline of the present invention, which depicts the relation between various elements practically used in the invention.

Figure 2:
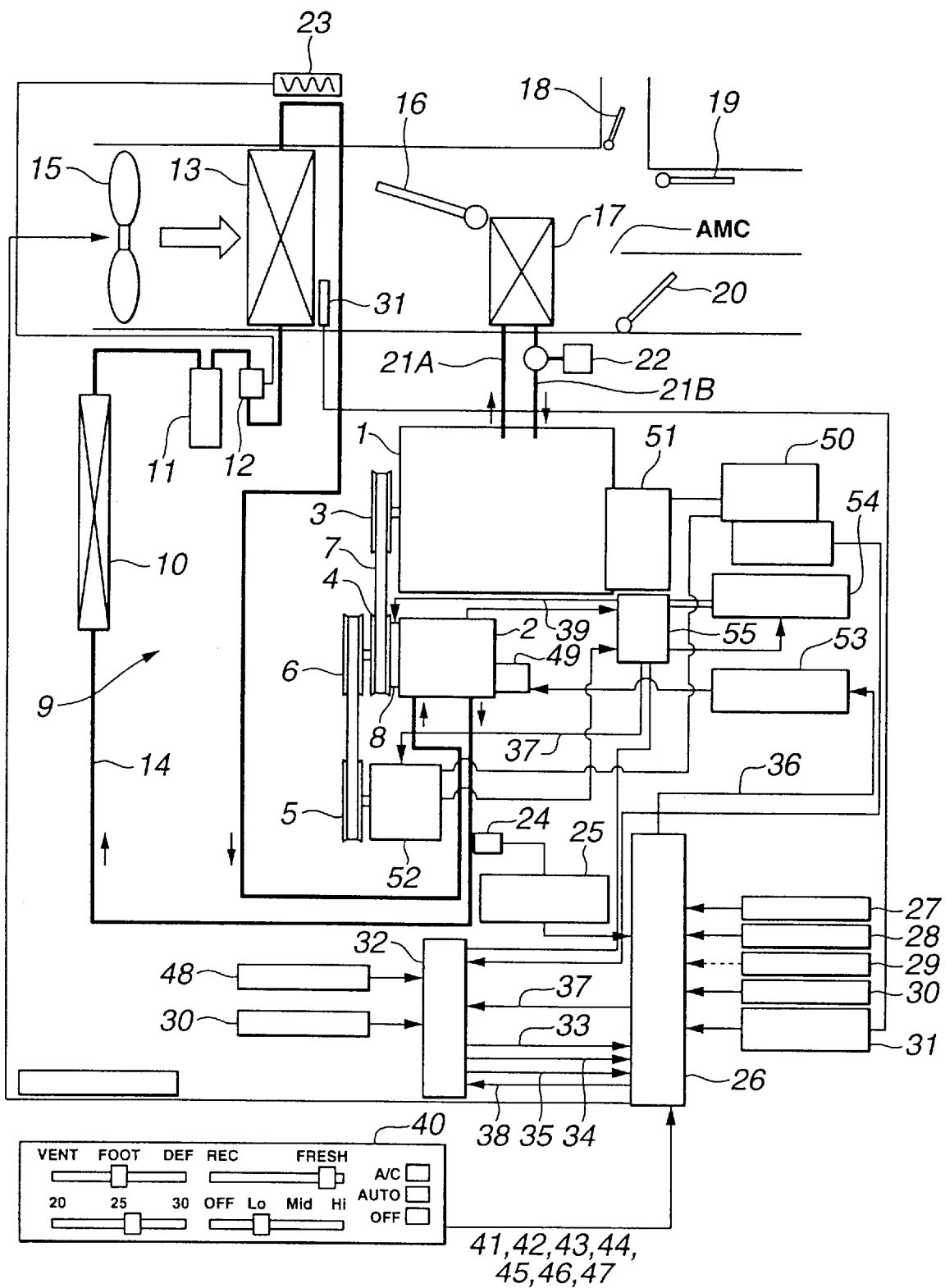
FIG. 2 is a block diagram of an automotive air conditioning system of a first embodiment of the present invention.

Referring to FIG. 2, there is shown a block diagram of an automotive air conditioning system of the present invention. As will become apparent as the description proceeds, the compressor used in this embodiment of a hybrid type.

In FIG. 2, denoted by numeral 1 is an internal combustion engine of a motor vehicle. The engine 1 is has a first drive pulley 3 driven by an output shaft of the engine 1. Denoted by numeral 2 is a compressor of a cooling section 9 of the air conditioning system 100A, whose input shaft has a first driven pulley 4 connected thereto through an electric clutch 8. The first drive pulley 3 and the first driven pulley 4 are connected through a V-belt 7 to permit transmission of power of the engine 1 to the input shaft of the compressor 2. A second driven pulley 6 is connected to the input shaft of the compressor 2 through the electric clutch 8. A second drive pulley 5 is connected to an output shaft of an electric motor 52, so that the power of the electric motor 52 can be transmitted to the input shaft of the compressor 2. Designated by numeral 50 is a starter generator, and denoted by numeral 50 is a battery mounted on the vehicle.

The cooling section 9 of the air conditioning system comprises generally the compressor 2, a condenser 10, a liquid tank 11, an expansion valve 12 and an evaporator 13 which are connected in order by a pipe 14 through which a refrigerant flows in the direction of arrows.

The evaporator 13 is installed in an air duct for cooling air directed toward a passenger room of the associated motor vehicle. That is, positioned upstream of the evaporator 13 is an electric blower by which an outside air, an inside air or both of them are forced to flow toward the evaporator 15. Positioned downstream of the evaporator 13 is a heater 17 whose heat source is an engine cooling water. For this, water inlet and outlet pipes 21A and 21B are arranged between the heater 17 and the engine 1, as shown. Denoted by numeral 16 is an air mix door which functions to control an air flow rate between a heater-bypassing passage "HBP" and a heater-passing passage "HPP". The heater-bypassing passage "HBP" is a passage leading to an air mix chamber "AMC" bypassing the heater 17 and the heater-passing passage "HPP" is a passage leading to the air mix chamber "AMC" through the heater 17. A defroster door 18, a ventilator door 19 and a foot space door 20 are installed in respective passages leading from the air mix chamber "AMC". These passages are led to given portions of the passenger room, in a known manner. The outlet pipe 21B of the heater 17 is equipped with a control valve 22 by which flow rate of the engine cooling water in the heater 17 is controlled.

Denoted by numeral 23 is a temperature sensor that detects the temperature of the refrigerant just coming from the evaporator 13. In accordance with the temperature detected by the temperature sensor 23, the open degree of the expansion valve 12 is controlled. That is, with increase of the temperature, the open degree increases permitting increased flow of the refrigerant through the cooling section 9.

The pipe 14 extending from the outlet of the compressor 2 is equipped with a pressure sensor 24 which detects a pressure possessed by the refrigerant just discharged from the compressor 2 and thus, the operation condition of the cooling section 9 can be checked. That is, when the refrigerant exhibits a higher pressure, it is recognized that the cooling section is subjected to a higher load and thus the compressor 2 needs a greater driving force. Information signals from the pressure sensor 24 are fed to a compressor capacity detecting circuit 25 into which information signals representing a vehicle speed and an engine speed are fed from an air conditioner control unit 26. Thus, at the compressor capacity detecting circuit 25, both a driving load and the capacity of the compressor 2 can be calculated. That is, with increase of the engine speed, the rotation speed of the compressor 2 is increased thereby increasing the refrigerant discharge from the compressor 2. The increased discharge of the refrigerant brings about increase of the refrigerant flowing in the condenser 10 and thus causes insufficient cooling of the refrigerant by the outside air, resulting in that a higher pressure side of the cooling section is increased in pressure. That is, the higher pressure is much increased. While, when the vehicle speed increases, the amount of outside air passing through the condenser 10 increases thereby increasing the ability of cooling the highly pressurized refrigerant flowing in the condenser 10. Thus, in this case, the higher pressure is lowered. If the capacity of the compressor 2 is controlled so that the refrigerant discharge of the compressor increases per one rotation, the amount of refrigerant passing through the condenser 10 increases. In this case, the pressure of the higher pressure side is increased. That is, the pressure of the higher pressure side of the cooling section 9 is controlled by the engine speed, the vehicle speed and the discharging capacity of the compressor. This means that the discharging capacity of the compressor can be calculated or derived by detecting the pressure of the higher pressure side, the engine speed and the vehicle speed.

Into the air conditioner control unit 26, there are inputted information signals from a solar radiation sensor 27, an outside temperature sensor 28, an inside temperature sensor 29, a vehicle speed sensor 30 and an evaporator outlet air temperature sensor 31. Furthermore, into the control unit 26, there are inputted the information signal from the pressure sensor 24 and an engine stop signal 33, an engine speed signal 34 and an idling signal 35 from an engine control unit 32. From the control unit 26, there are outputted a vehicle speed signal and an engine speed signal to the compressor capacity detecting circuit 25, and outputted a compressor capacity signal 36 to a compressor capacity control circuit 53, and outputted a compressor driving signal 37, an engine stop delay signal 38 and a compressor drive mode selection signal 39 to the engine control unit 32.

Into the air conditioner control unit 26, there are further fed six types of information signals from an air controller control panel 40, which are an outlet opening determining signal 41, a passenger room temperature setting signal 42, an intake opening determining signal 43, an air flow amount setting signal 44, a compressor setting signal 45, an automatic controlling signal 46 and an air conditioner stop setting signal 47.

Into the engine control unit 32, there is fed a signal from an ignition switch 48, in addition to the signal from the vehicle speed sensor 30, the compressor driving signal 37, the engine stop delay signal 38 and the compressor drive mode selection signal 39. As is described hereinabove, the engine stop signal 33, the engine speed signal 34 and the idling signal 35 are outputted from the engine control unit 32 to the air conditioner control unit 26. The compressor drive mode signal 39 is fed to a compressor drive mode selection circuit 54. Denoted by numeral 55 is a control circuit for controlling the electric motor 52, the compressor drive mode selection circuit 54 by processing various information signals fed thereto.

In the compressor drive mode selection circuit 54, based on the compressor drive mode signal 39 from the engine control unit 32, one of three operation modes is selected, which are an engine drive mode wherein the compressor 2 is driven by only the engine 1, a motor drive mode wherein the compressor 2 is driven by only the electric motor 52 and a combination mode wherein the compressor 2 is driven by both the engine 1 and the electric motor 52. That is, as has been mentioned hereinabove, the compressor 2 is of a hybrid type.

Based on an instruction signal fed thereto from the air conditioner control unit 26, the compressor capacity control circuit 53 outputs a capacity setting signal to a capacitor control valve 49 of the compressor 2 for adjusting the refrigerant discharge from the compressor 2. That is, the refrigerant discharge per one rotation is adjusted.

In the following, operation will be described in detail with reference to the drawings.

In general, various information signals are led into the engine control unit 32 and the air conditioner control unit 26. With this, the engine control unit 32 controls operation of the engine of the vehicle and the air conditioner control unit 26 controls operation of the air conditioning system. Upon receiving the engine stop signal, the engine control unit 32 stops the engine 1 and at the same time the air conditioner control unit 26 changes the mode of the compressor 2 from the engine drive mode to the motor drive mode. That is, first, the electric motor 52 is energized and when the capacity of the compressor 2 is reduced to a lower given level, the engine 1 is stopped. Under this condition, the compressor 2 is driven by only the electric motor 52.

Figure 3:
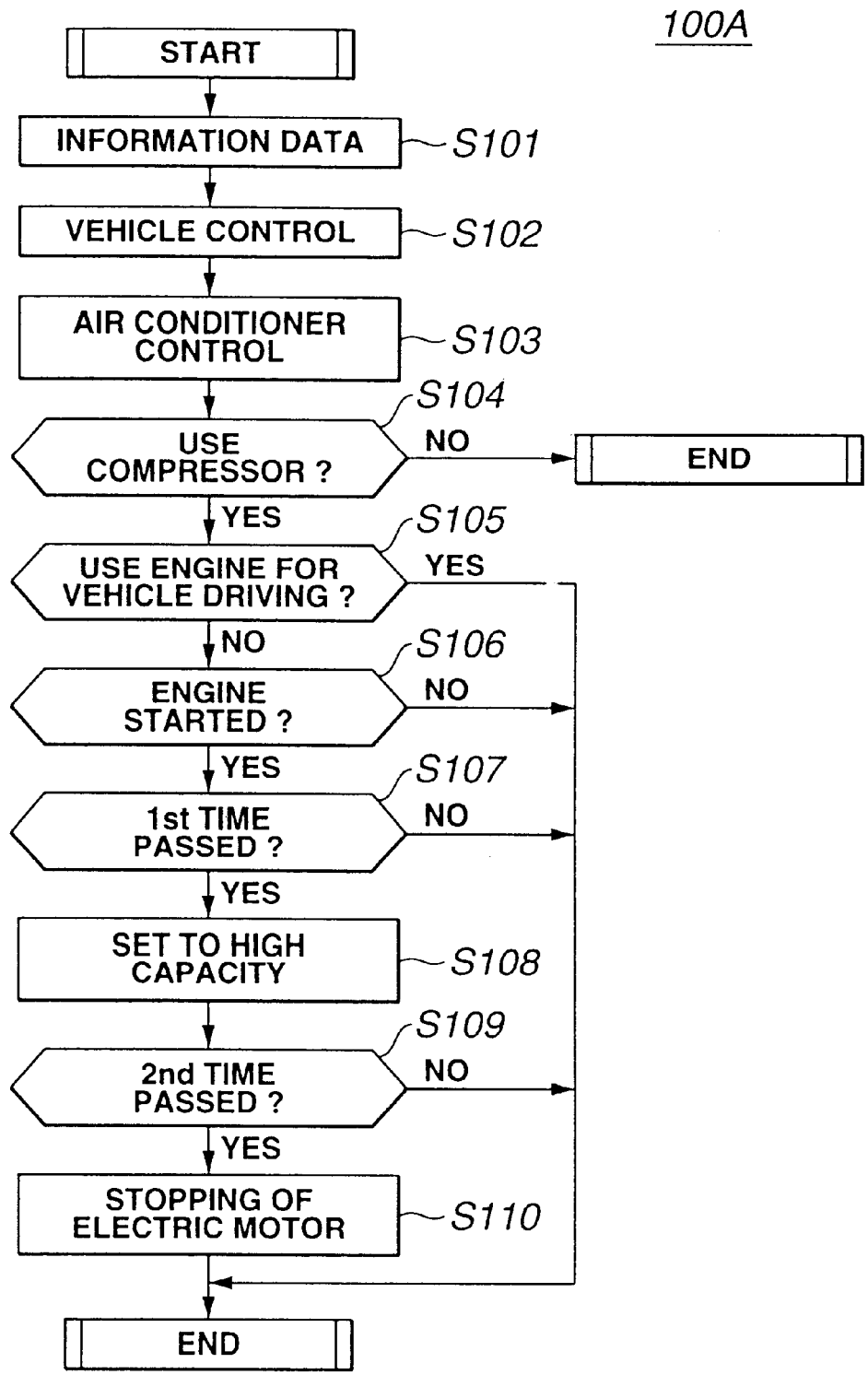
FIG. 3 is a flowchart showing operation steps executed in the first embodiment of the invention.

Referring to FIG. 3, there is shown a flowchart which shows operation steps executed in a first embodiment 100A of the present invention, for controlling the compressor 2 from the time when the engine 1 is kept stopped and the electric motor 52 is kept operated for driving the compressor 2 on a predetermined low capacity.

At step 101, various information data are put into the engine control unit 32 and the air conditioner control unit 26. At step 102, the engine control unit 32 decides an engine control mode based on the information data fed thereto. At step S103, the air conditioner control unit 26 decides an air conditioner mode based on the information data fed thereto. At step S104, judgment is carried out as to whether or not the compressor 2 is being used for the air conditioning. If YES, that is, when the compressor 2 is being used for such purpose, the operation flow goes to step S105. While, if NOT, the operation flow goes to END. At step S105, judgment is carried out as to whether or not the engine 1 is used for actually driving the vehicle. If YES, that is, when the engine 1 is used for such purpose, the operation flow goes to END. While, if NO, that is, when the engine 1 is not used for such purpose, the operation flow goes to step S106. At this step S106, judgement is carried out as to whether the engine 1 has already started or not. If YES, that is, when the engine 1 has already started, the operation flow goes to step S107. While, if NO, the operation flow goes to END. At step S107, judgement is carried out as to whether or not a first predetermined time has passed from the starting of the engine 1. If YES, that is, when the first predetermined time has passed, the operation flow goes to step S108. While, if NOT, the operation flow goes to END. At step S108, the compressor 2 is adjusted to have a predetermined high capacity. Then, the operation flow goes to step S109 where judgement is carried out as to whether a second given time has passed from the starting of the engine 1. If YES, the operation flow goes to step S110. While, if NO, the operation flow goes to END. At step S110, the electric motor 52 is stopped.

As is seen from the above, in the first embodiment 100A, upon passage of the first given time from the starting of the engine 1, the capacity control of the compressor 2 is made, so that the capacity is increased to the given level from the existing level. That is, the compressor 2 is controlled to have a higher given level before stopping the electric motor 52.

Figure 6:
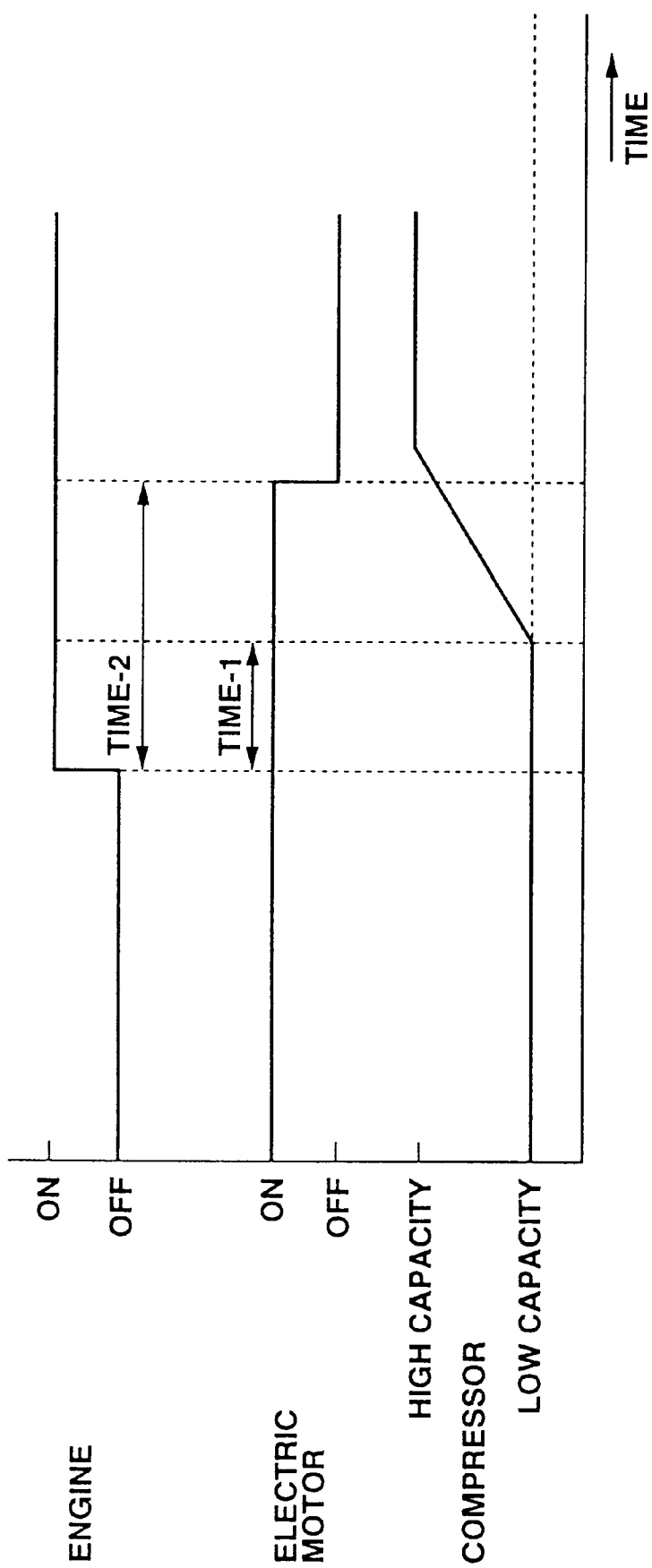
FIG. 6 is a time chart showing operation conditions of three elements (engine, electric motor and compressor) in case of the first embodiment.

FIG. 6 is a time chart showing operation conditions of the engine 1, the electric motor 52 and the compressor 2 in case of the first embodiment 100A. As is seen from this time chart, during the shifting from the compressor operation on the predetermined low capacity to the compressor operation on the predetermined high capacity, both the electric motor 52 and the engine 1 operate. Thus, in this embodiment 100A, there is no need of using a powerful type for the electric motor 52.

Figure 4:
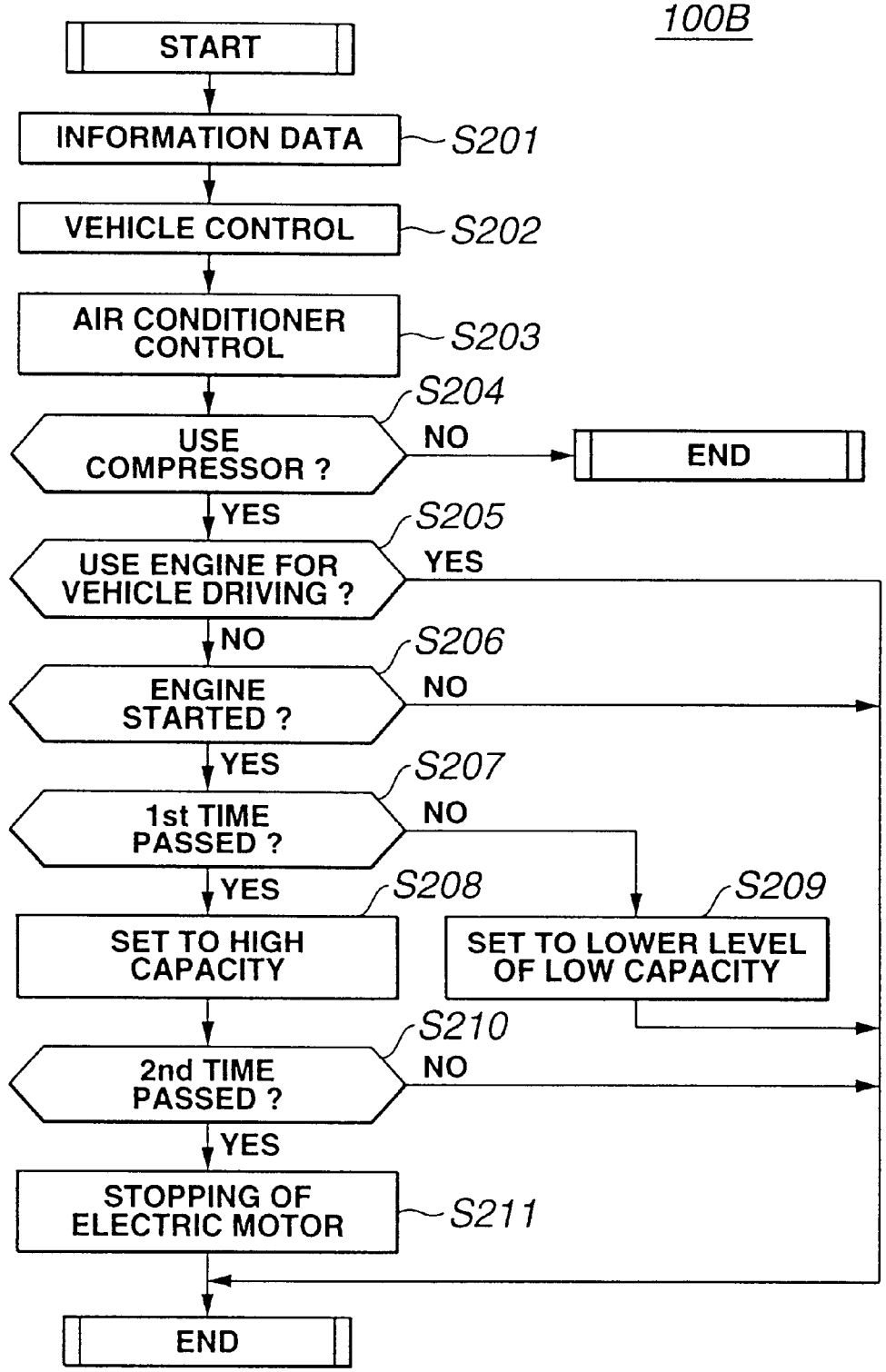
FIG. 4 is a flowchart showing operation steps executed in a second embodiment of the present invention.

Referring to FIG. 4, there is shown a flowchart which shows operation steps executed in a second embodiment 100B of the present invention, for controlling the compressor 2 from the time when the engine 1 is kept stopped and the electric motor 52 is kept operated to drive the compressor 2 on a higher level of a predetermined low capacity.

At step S201, various information date are put into the engine control unit 32 and the air conditioner control unit 26. At step S202, the engine control unit 32 decides an engine control mode based on the information data fed thereto. At step S203, the air conditioner control unit 26 decides an air conditioner mode based on the information data fed thereto. At step S204, judgment is carried out as to whether or not the compressor 2 is being used for air conditioning. If YES, that is, when the compressor 2 is being used for such purpose, the operation flow goes to step S205. While, if NOT, the operation flow goes to END. At step S205, judgement is carried out as to whether or not the engine 1 is used for actually driving the vehicle. If YES, that is, when the engine 1 is used for such purpose, the operation flow goes to END. While, if NO, the operation flow goes to step S206. At this step S206, judgement is carried out as to whether the engine 1 has already started or not. If YES, that is, when the engine 1 has already started, the operation flow goes to step S207. While, if NO, the operation flow goes to END. At step S207, judgement is carried out as to whether or not a first predetermined time has passed from the starting of the engine 1. If YES, that is, when the first predetermined time has passed, the operation flow goes to step S208. While, if NO, that is, when the second predetermined time has not passed yet, the operation flow goes to step S209. At the step S208, the compressor 2 is adjusted to have a predetermined high capacity. While, at the step 5209, the compressor 2 is adjusted to have a lower level of the predetermined low capacity, and then the operation flow goes to END. After the step S208, the operation flow goes to step S210 where judgement is carried out as to whether or not a second predetermined time has passed from the starting of the engine 1. If YES, that is, when the second predetermined time has passed, the operation flow goes to step S211 where the electric motor 52 is stopped. If NO at step S210, that is, when the second predetermined time has not passed, the operation flow goes to END.

As may be understood from the above, the control of the second embodiment 100B is similar to that of the first embodiment 100A. However, in the second embodiment 100B, predetermined higher and lower capacities for the compressor 2 are provided in addition to the predetermined high capacity.

Figure 7:
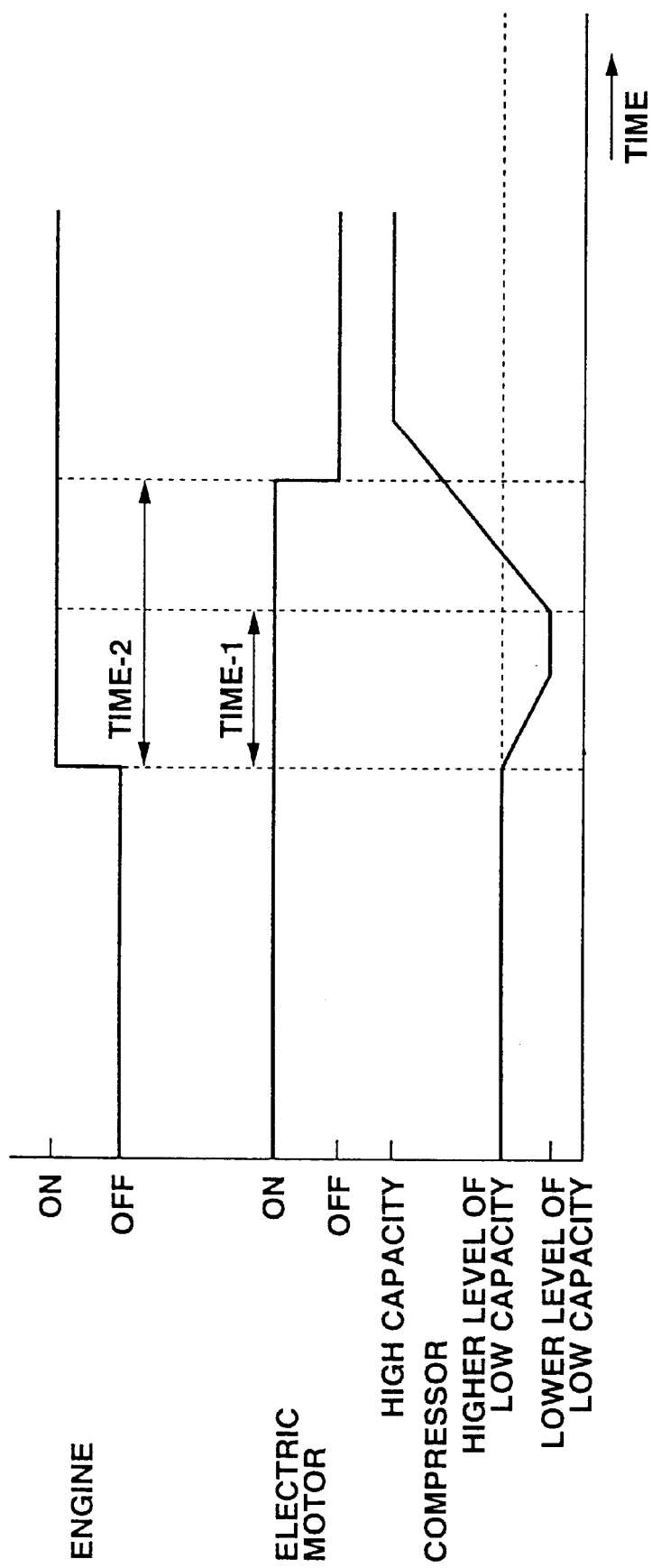
FIG. 7 is a time chart showing operation conditions of the three elements in case of the second embodiment.

FIG. 7 is a time chart showing operation conditions of the engine 1, the electric motor 52 and the compressor 2 in case of the second embodiment 100B. As is seen from this time chart, during the shifting from the compressor operation on the higher level of the predetermined low capacity to the compressor operation on the predetermined high capacity, there is provided a compressor operation effected on the lower level of the predetermined low capacity, which is powered by both the electric motor 52 and the engine 1. This operation is very advantageous because just after starting of the engine 1, the engine fails to produce a sufficient power. Thus, for compensating this power reduction of the engine 1, the capacity of the compressor 2 is lowered to the lower level of the predetermined low capacity. Of course, due to the shifting from the higher level of the predetermined low capacity to the lower level of that of the compressor 2, the power needed by the electric motor 52 can be reduced, which brings about a power saving of a battery for powering the electric motor 52 and thus induces an improved fuel efficiency of the engine 1.

Figure 5A:
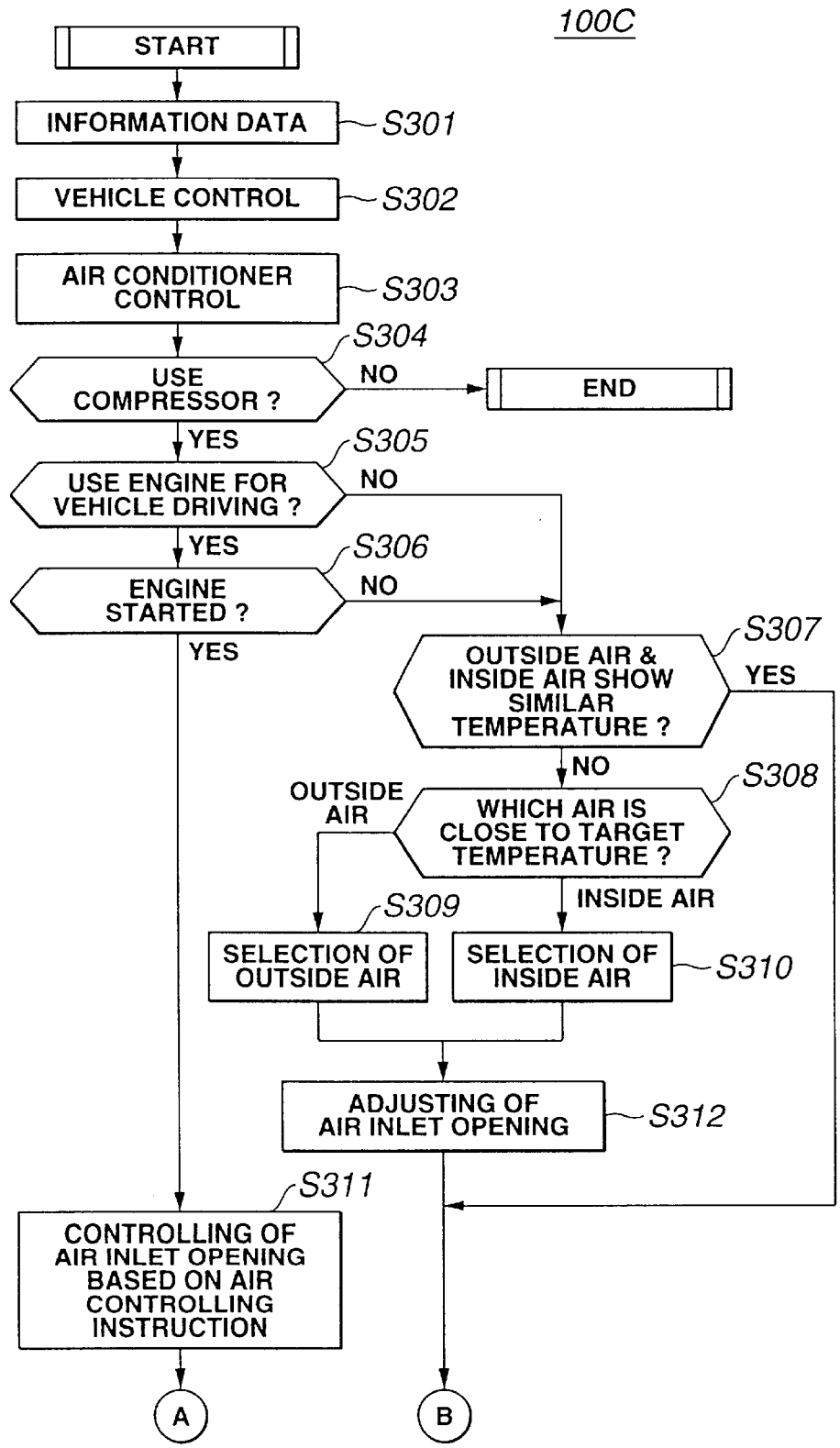
FIGS. 5A and 5B are upstream and downstream parts of a flowchart of operation steps executed in a third embodiment of the present invention.
Figure 5B:
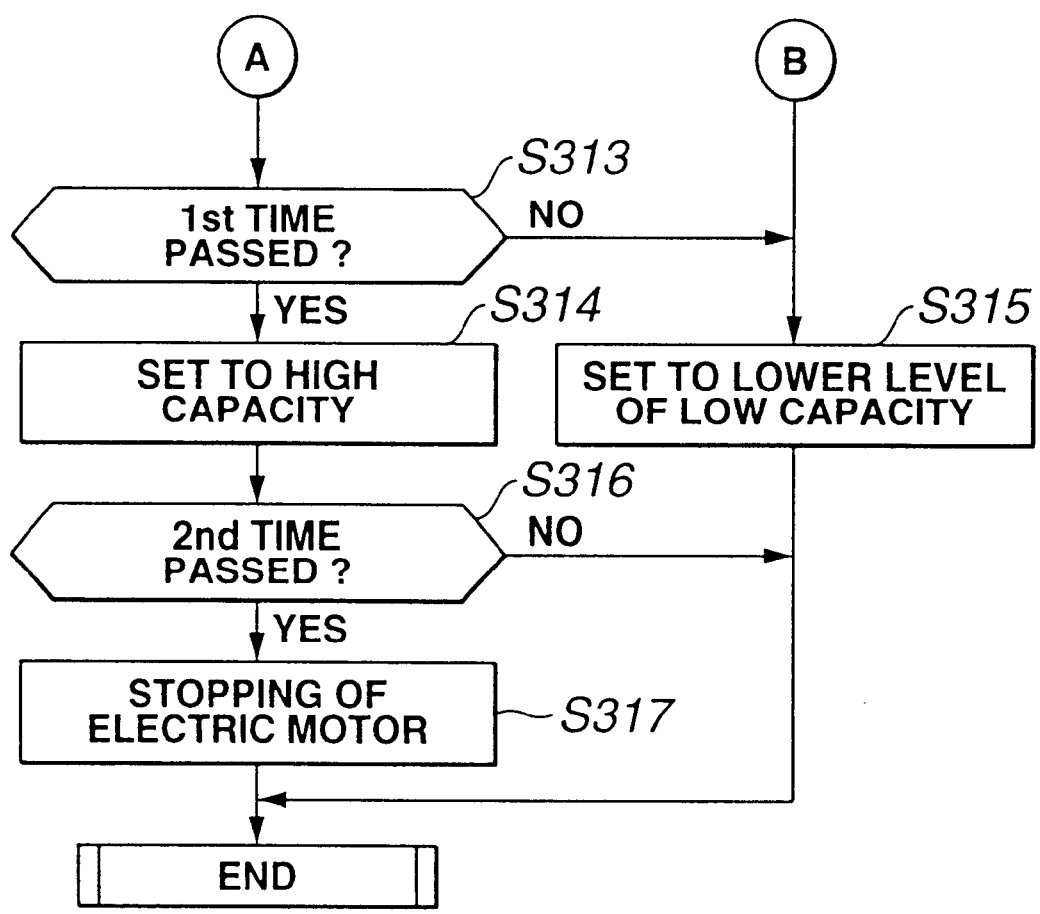

Referring to FIGS. 5A and 5B, there is shown a flowchart which shows operation steps executed in a third embodiment 100C of the present invention, for controlling the compressor 2 from the time when the engine 1 is kept stopped, the electric motor 52 is kept operated to drive the compressor 2 on the higher level of the predetermined low capacity and an air inlet opening is kept in an optimum temperature control mode (or second mode).

At step S301, various information data are put into the engine control unit 32 and the air conditioner control unit 26. At step S302, the engine control unit 32 decides an engine control mode based on the information data fed thereto. At step S303, the air conditioner control unit 26 decides an air conditioner mode based on the information data fed thereto. At step S304, judgement is carried out as to whether or not the compressor 2 is being used for air conditioning. If YES, that is, when the compressor 2 is being used for such purpose, the operation flow goes to step S305. If NO, the operation flow goes to END. At step S305, judgement is carried out as to whether or not the engine 1 is used for actually driving the vehicle. If YES, that is, when the engine 1 is used for such purpose, the operation flow goes to step S306. While, if NO, the operation flow goes to step S307. At step S306, judgement is carried out as to whether the engine 1 has started or not. If YES, that is, when the engine 1 has started, the operation flow goes to step S311. While, if NO, the operation flow goes to step S307. At this step S307, judgement is carried out as to whether an outside air and an inside air show a similar temperature or not. If YES, that is, when the temperatures of such two air flow show a similar value, the operation flow goes to step S315. While if NO, the operation flow goes to step S308. At this step S308, judgement is carried out as to which one between the outside air and the inside air shows a temperature close to a target temperature of the air which is blown into the passenger room from air blowing openings. If the outside air shows a temperature close to the target one, the operation flow goes to step S309. While if the inside air shows a temperature close to the target one, the operation flow goes to step S310. At the step S309, a selection is so made that the outside air is used as an inlet air. At the step S310, a selection is so made that the inside air is used as the inlet air. From the step S309 or S310, the operation flow goes to step S312 where the air inlet opening is controlled to appropriately control the flow of the outside or inside air therethrough. Then the operation flow goes to step S315.

At the above-mentioned step S311, the air inlet opening is controlled in accordance with the instruction signal issued from the air conditioner control unit 26. Then, the operation flow goes to step S313. At this step S313, judgement is carried out as to whether or not a first predetermined time has passed from the starting of the engine 1. If YES, that is, when the first predetermined time has passed, the operation flow goes to step S314. While, if NO, the operation flow goes to step S315. At step S314, the compressor 2 is adjusted to have the predetermined high capacity. While, at step S315, the compressor 2 is adjusted to have the lower level of the predetermined low capacity, and then, the operation flow goes to END. After the step S314, the operation flow goes to step S316 where judgement is carried out as to whether or not a second predetermined time has passed from the starting of the engine 1. If YES, the operation flow goes to step S317 where the electric motor 52 is stopped, and then the operation flow goes to END. If NO at step S316, the operation flow goes to END.

Figure 8:
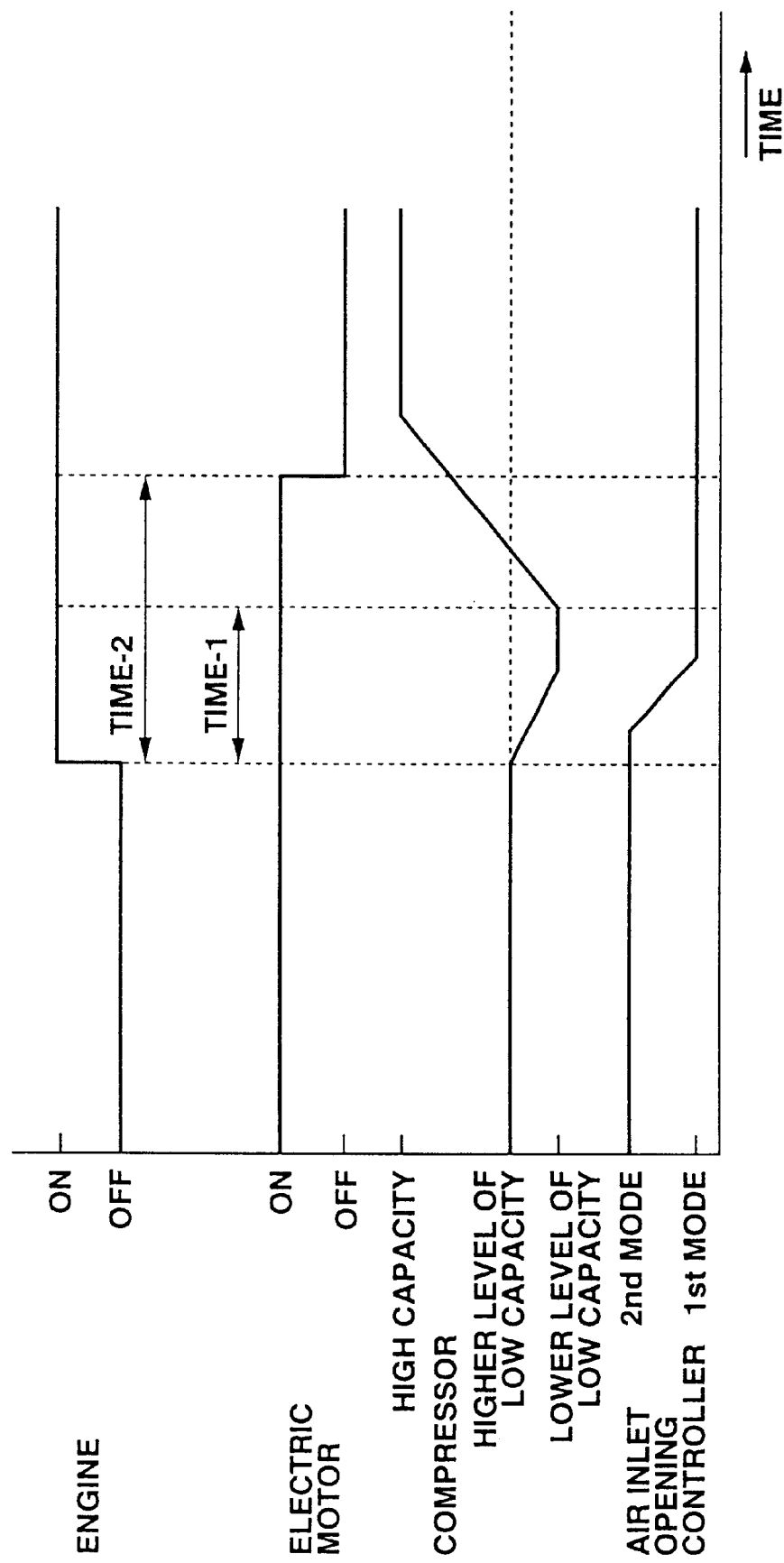
FIG. 8 is a time chart showing operation conditions of four elements in case of the third embodiment.

FIG. 8 is a time chart showing operation conditions of the engine 1, the electric motor 52, the compressor 2 and an air inlet opening controller in case of the third embodiment 100C. As is seen from this time chart, the basic control of this third embodiment 100C is identical to that of the above-mentioned second embodiment 100B. However in the third embodiment 100C, control to the air inlet opening is adopted. That is, when the engine 1 is kept stopped, the air inlet opening is controlled to assume the optimum temperature control mode (second mode). In this mode, either one of the outside air and the inside air, that is showing a temperature close to the target temperature of air blown into the passenger room, is selected and led into the air inlet opening.

As is understood from the time chart, when the compressor 2 is driven by only the electric motor 52 under stopping of the engine 1, the compressor 2 is kept at the predetermined low capacity (more specifically, a higher level of the low capacity). Thus power saving of the battery for the electric motor 52 is achieved.

Figure 9B:
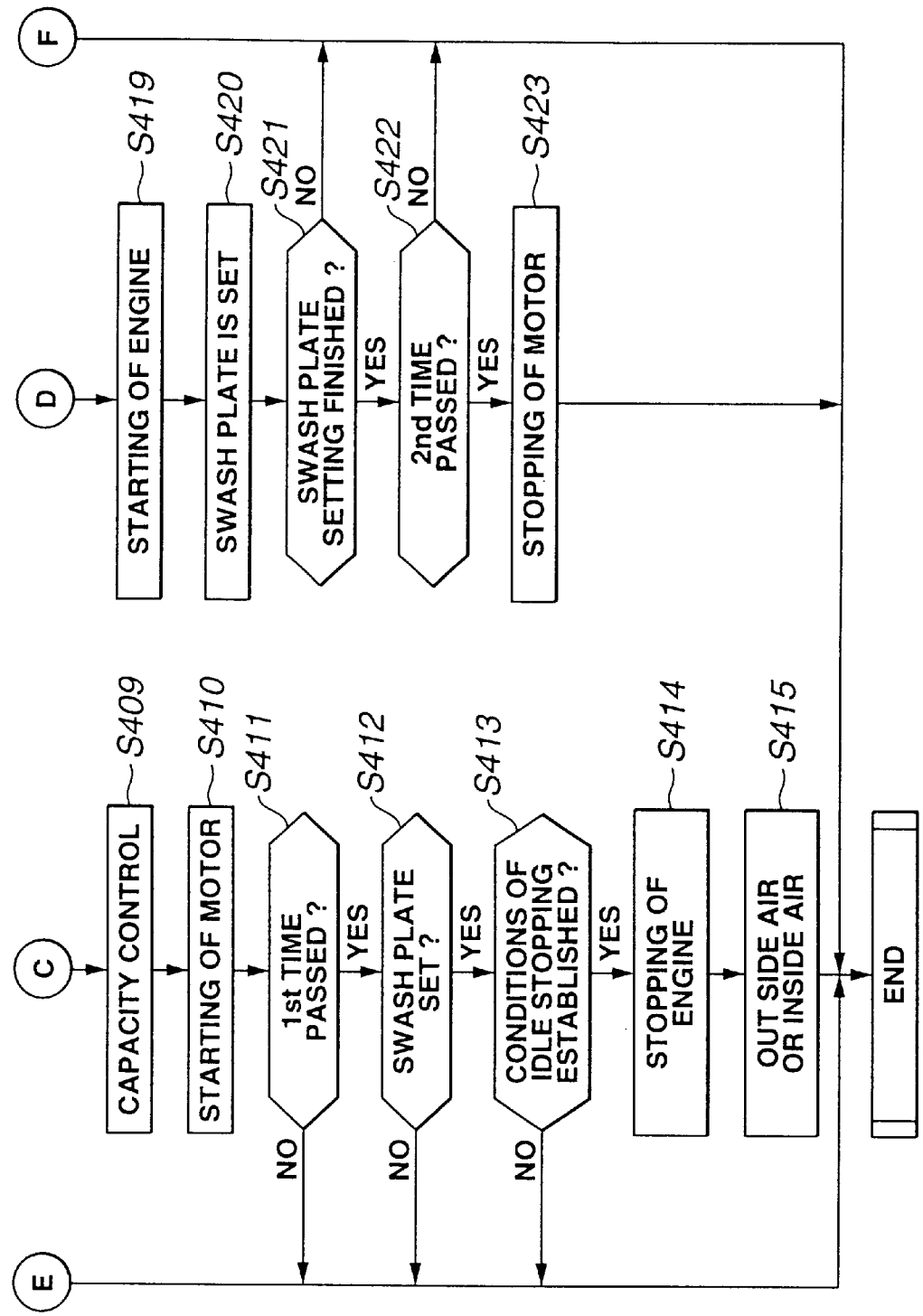

Referring to FIGS. 9A and 9B, there is shown a flowchart which shows operation steps executed in a fourth embodiment 100D of the present invention, for controlling the compressor 2. In this embodiment 100D, the compressor 2 is of a swash plate valuable type.

At step S401, the engine control unit 32 controls the operation of the engine 1 based on various information data fed thereto. At step S402, the air conditioner control unit 26 controls the operation of the air conditioning system. At step S403, judgement is carried out as to whether or not the compressor 2 is to be used for air conditioning. If YES, that is, when the compressor 2 is to be used for the air conditioning, the operation flow goes to step S404. If NO, the operation flow goes to END. At step S404, judgement is carried out as to whether the engine 1 is operating or not. If YES, that is, when the engine 1 is operating, the operation flow goes to step S405. While, if NO, the operation flow goes to step S416 which will be described in detail hereinafter.

At step S405, information data used for judging whether an idling stop of the engine 1 is possible or not in the existing condition are received. It is to be noted that the idling stop means a temporary stop of the engine 1 automatically induced when the associated motor vehicle stops due to a red light at a crossing or the like, which brings about improvement in fuel efficiency of the engine. It is further to be noted that the information data for the judgement at step S405 are a signal representing braking of the vehicle by the driver, a signal representing release of the driver's foot from an accelerator pedal, a signal representing 0 speed of the vehicle, and so on. At step S406, based on such information data, judgment is carried out as to whether or not the existing condition is ready for the idling stop. If YES, that is, when the existing condition is ready for the idling stop, the operation flow goes to step S407. While, if NO, the operation flow goes to END. At step S407, based on information data, a power needed for driving the compressor 2 is calculated. It is to be noted that the information data at this step are a signal representing a thermal environmental condition of the vehicle, a signal representing the cooling condition of the cooling section 9 of the air conditioning system, and so on. After the step S407, the operation flow goes to step S408.

At this step S408, judgment is carried out as to whether the calculated power is obtainable by only the electric motor 52 or not. If NO, that is, when the power is not obtainable by the motor 52, the operation flow goes to END. While, if YES, that is, when the calculated power is obtainable by only the electric motor 52, the operation flow goes to step S409. At this step, the compressor 2 is adjusted to have a predetermined low capacity. With this, the driving load of the compressor 2 can be reduced. However, if desired, in view of the relatively lower rotation speed of the electric motor 52, the capacity of the compressor 2 may be set at a relatively higher level of the predetermined low capacity. Then, at step S410, the electric motor 52 is energized to drive the compressor 2. Then, at step S411, judgement is carried out as to whether or not a first predetermined time has passed from the time of energization of the electric motor 52. This time is needed for bringing the electric motor 52 into a condition to have a given rotation speed and bringing the compressor 2 into a condition to have the set capacity. If YES at step S411, that is, when the first predetermined time has passed, the operation flow goes to step S412. While, if NO, the operation flow goes to END. At the step S412, judgement is carried out as to whether or not the swash plate of the compressor 2 has shown a predetermined angle relative to a rotation shaft on which the swash plate is pivotally mounted. If NO, the operation flow goes to END. While, if YES, that is, when the swash plate has shown the predetermined angle, the operation flow goes to step S413. At this step, judgement is carried out as to whether or not the conditions for allowing the idling stop are all established. If NO, the operation flow goes to END. While, if YES, that is, when the conditions for allowing the idling stop are all established, the operation flow goes to step S414. At this step, the engine 1 is stopped. Upon this, the compressor 2 is driven by only the electric motor 52. Then, at step S415, the air inlet opening is controlled to inlet either one of the outside air and the inside air, that is showing a temperature close to the target temperature of air blown into the passenger room.

If, at step S404, the engine 1 is not operating, the operation flow goes to step S416. At this step, information data used for keeping the idling stop are received. It is to be noted that the information data are a signal representing release of a driver's foot from an accelerator pedal, a signal representing a sufficient power stored in the battery and so on. At step S417, based on the information signals, ending of the idling stop is decided. That is, if the battery shows a lack of power stored therein, the idling stop condition is ceased, and judgement is carried out as to whether the engine 1 is operated or not. At step S418, judgement is carried out as to whether or not the existing condition is ready for a new condition wherein the electric motor 52 is stopped and the engine 1 is started. If NO, the operation flow goes to END. While, if YES, that is, when the existing condition is ready for such new condition, the operation flow goes to step S419. At this step, the engine 1 is started, and then at step s420, the swash plate of the compressor 2 is adjusted to have a predetermined angle relative to the rotation shaft. Then, the operation flow goes to step S421. At this step, judgement is carried out as to whether the angle adjustment of the swash plate has been finished or not. If NO, the operation flow goes to END. While, if YES, that is, when the angle adjustment has been finished, the operation flow goes to step S422. At this step, judgement is carried out as to whether or not a second predetermined time has passed from the time of starting of the engine 1. If NO, the operation flow goes to END. While, if YES, that is, when the second predetermined time has passed, the operation flow goes to step S423 to stop the electric motor 52. Thus, under this condition, the compressor 2 is driven by only the engine 1.

Figure 10:
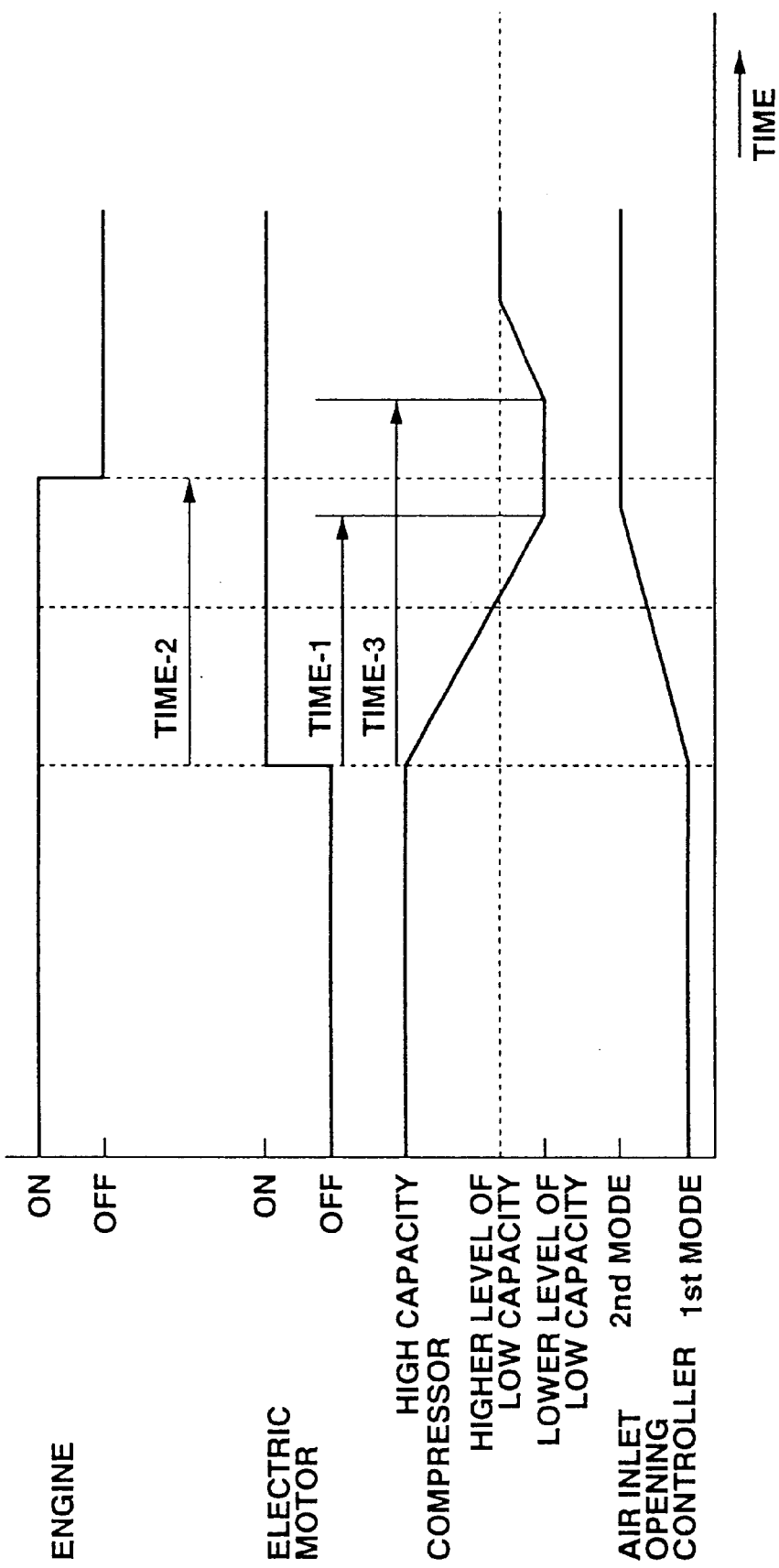
FIG. 10 is a time chart showing operation conditions of four elements in case of the fourth embodiment.

FIG. 10 is a time chart showing operation conditions of the engine 1, the electric motor 52, the compressor 2 and the air inlet opening controller in case of the fourth embodiment 100D. As is seen from this time chart, during the operation of the engine 1, the compressor 2 is operated on the predetermined high capacity and the air inlet opening is controlled to assume a normal control mode. Upon receiving a signal representative of a temporary stopping of the vehicle due to a red light at a crossing of the like, the electric motor 52 is turned ON. Upon this, the compressor 2 is controlled to reduce its capacity toward the lower level of the predetermined low capacity. Upon passage of a first given time from the turn-ON time of the electric motor 52, the capacity of the compressor 2 is controlled to the lower level of the predetermined low capacity. When the capacity of the compressor 2 is completely reduced to the lower level of the predetermined low capacity, that is, when a second given time has passed from the turn-ON time of the electric motor 52, the engine 1 is stopped. When a third given time has passed from the turn-ON time of the electric motor 52, that is, when a small given time has passed from the stop time of engine 1, the compressor 2 is controlled to increase its capacity toward the higher level of the predetermined low capacity. Thus thereafter, the compressor 2 is operated on the higher level of the predetermined low capacity under driving by only the electric motor 52. As is seen from the time chart, upon ON-turning of the electric motor 52, the air inlet opening is controlled to adopt the optimum temperature control mode. Due to usage of the lower level of the predetermined low capacity of the compressor 2 upon stopping of the engine 1, the power saving of the battery for the electric motor 52 is achieved.

The entire contents of Japanese Patent Application P11-163349 (filed Jun. 10, 1999) are incorporated herein by reference.

Although the invention has been described above with reference to the embodiments A, B, C and D of the invention, the invention is not limited to the embodiments described above. Various modifications and variations of the embodiments described above will occur to those skilled in the art, in light of the above teachings.

What is claimed is:

1. An air conditioning system for use in a motor vehicle powered by an internal combustion engine, comprising:
   an electric motor powered by a battery;
   a compressor arranged to be powered by at least one of the internal combustion engine and said electric motor; and
   a control unit that controls the driving of said compressor, said control unit being configured to execute:
      driving said compressor by only said electric motor when the combustion engine is under an idling stop;
      restarting said combustion engine upon expiration of a first given time from the time when the idling stop has occurred, so that thereafter said compressor is driven by both said combustion engine and said electric motor; and
      stopping the driving of the compressor by said electric motor upon expiration of a second given time from the restarting of said combustion engine, so that thereafter said compressor is driven by only said combustion engine.

2. An air conditioning system as claimed in claim 1, in which said control unit is configured to execute, after the step (c), (e) controlling an air inlet opening to inlet thereinto either one of outside air and inside air, which shows a temperature close to a temperature possessed by air blow into a passenger room of the vehicle.

3. An air conditioning system for use in a motor vehicle powered by an internal combustion engine, comprising:
   an electric motor powered by a battery;
   a capacity variable compressor arranged to be powered by at least one of said internal combustion engine and said electric motor; and
   a control unit that controls the driving of said compressor, said control unit being configured to execute:
      (a) calculating a power needed for driving the compressor when the vehicle is ready for an idling stop of the engine;
      (b) starting said electric motor when it is decided that the calculated power is obtainable by only said electric motor, so that thereafter said compressor is driven by both said internal combustion engine and said electric motor; and
      (c) executing the idling stop upon expiration of a first predetermined time from the time when said electric motor has started.

4. An air conditioning system as claimed in claim 3, in which said control unit is configured to execute, between the steps (a) and (b), (d) adjusting the compressor to have a predetermined lower capacity.

5. An air conditioning system as claimed in claim 4, in which said control unit is configured to execute the step (c) only when, due to adjustment of the compressor to the predetermined lower capacity, a swash plate of the capacity valuable compressor has shown a predetermined angle relative to a rotation shaft on which the swash plate is pivotally mounted.

6. An air conditioning system as claimed in claim 5, in which said control unit is configured to execute the step (a) when it is judged that the compressor is to be used for air conditioning.

7. An air conditioning system as claimed in claim 6, in which said control unit is configured to execute the step (a) when it is judged that the engine is under operation.

8. An air conditioning system as claimed in claim 6, in which said control unit is configured to execute, if the engine is not under operation, (f) carrying out judgment as to whether or not the vehicle is ready for a new condition wherein the electric motor is stopped and the engine is started and (g) starting the engine when the step (f) judges that the vehicle is ready for the new condition.

9. An air conditioning system as claimed in claim 8, in which said control unit is configured to execute, after the step (g), (h) adjusting the swash plate of the compressor to have a predetermined angle relative to the rotation shaft.

10. An air conditioning system as claimed in claim 9, in which said control unit is configured to execute, after the step (h), (i) stopping the electric motor upon expiration of a second predetermined time from the time of starting of the engine.

11. An air conditioning system for use in a motor vehicle powered by an internal combustion engine, comprising:
   an electric motor powered by a battery;
   a capacity variable compressor arranged to be powered by at least one of said internal combustion engine and said electric motor, said compressor being controllable to have a high predetermined capacity, a lower level of a low predetermined capacity or a higher level of the low predetermined capacity;
   an air inlet opening controller arranged to inlet at least one of outside air and inside air into an air inlet opening of the air conditioning system, said air inlet opening controller having a first mode in which a normally conditioned air is led into a passenger room and a second mode in which the air inlet opening inlets either one of the outside air and inside air, that shows a temperature close to a target temperature of air blown into the passenger room; and
   a control unit that controls the driving of said compressor and said air inlet opening controller, said control unit being configured to execute:
      (a) keeping the compressor to operate in the high predetermined capacity and keeping the air inlet opening controller to operate in the first mode when the compressor is driven by only said engine;
      (b) controlling the compressor to have the lower level of the low predetermined capacity and controlling the air inlet opening controller to assume said second mode upon receiving a signal representative of a previous notice of a temporary engine stop;
(c) turning the electric motor ON;
(d) stopping the engine upon passage of a given time from the turning ON of the electric motor; and
(e) controlling the compressor to operate in the higher level of the low predetermined capacity upon passage of a given time from the engine stopping.

12. An air conditioning system as claimed in claim 11, in which said control unit is configured to execute between the step (a) and (b), (f) calculating a power needed for driving the compressor and (g) adjusting the compressor to the lower level of the low predetermined capacity in accordance with the calculated power.

13. An air conditioning system as claimed in claim 12, in which said control unit is configured to execute between the step (c) and (d), (h) adjusting a swash plate of the compressor to have a predetermined angle relative to a rotation shaft.

* * * * *

UNITED STATES PATENT AND TRADEMARK OFFICE
CERTIFICATE OF CORRECTION

PATENT NO.     : 6,351,957 B2
DATED          : March 5, 2002
INVENTOR(S)    : Junichiro Hara It is certified that error appears in the above-identified patent and that said Letters Patent is hereby corrected as shown below:

Column 11,
Line 48, claim 2 should read as:
  2. An air conditioning system as claimed in claim 3, in which said control unit is configured to execute, after the step (c), (e) controlling an air inlet opening to inlet thereinto either one of outside air and inside sir, which shows, a temperature close to a temperature possessed by air blow into a passenger room of the vehicle.

Signed and Sealed this

Twenty-ninth Day of November, 2005

JON W. DUDAS
*Director of the United States Patent and Trademark Office*